March 20, 1945. J. M. SCHUCKERS 2,371,653
CLUTCH
Filed Aug. 6, 1943 4 Sheets-Sheet 1
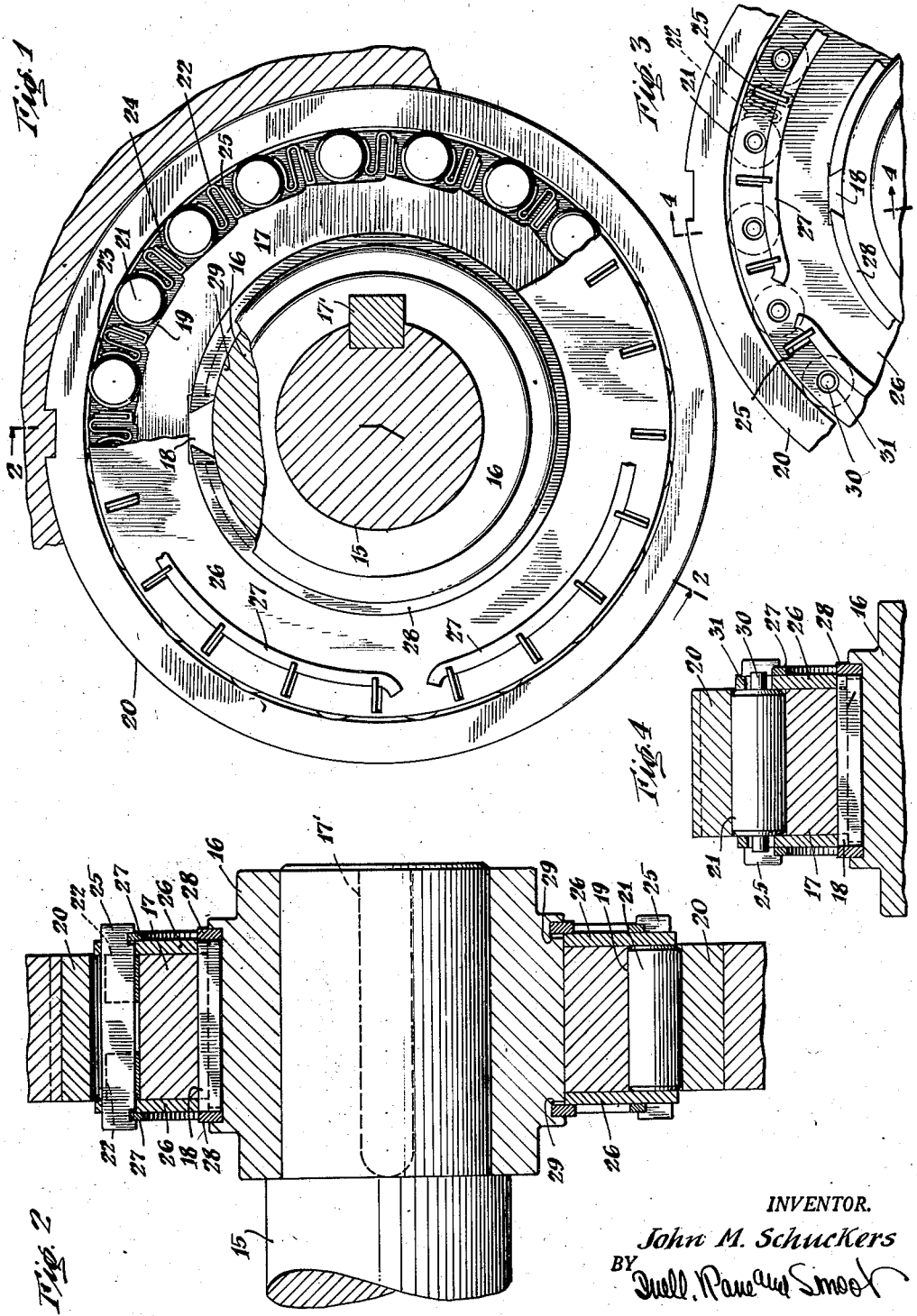
INVENTOR.
John M. Schuckers
BY
ATTORNEYS March 20, 1945.　　　J. M. SCHUCKERS　　　2,371,653
CLUTCH
Filed Aug. 6, 1943　　　4 Sheets-Sheet 2
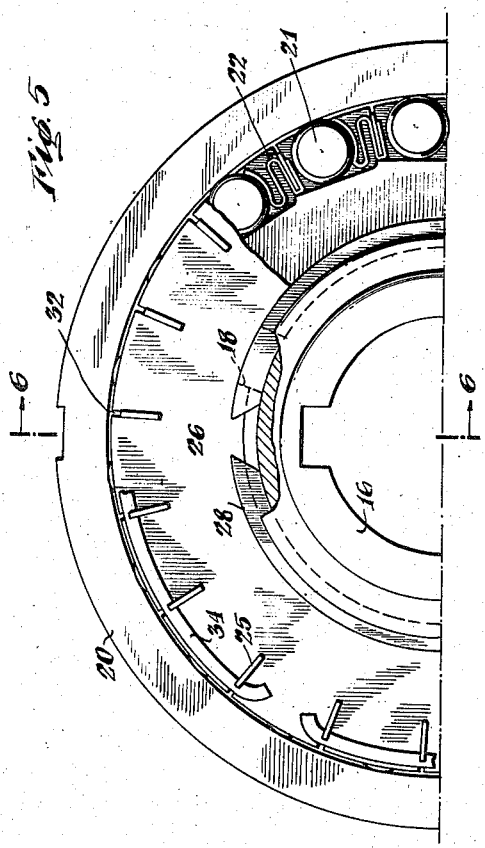
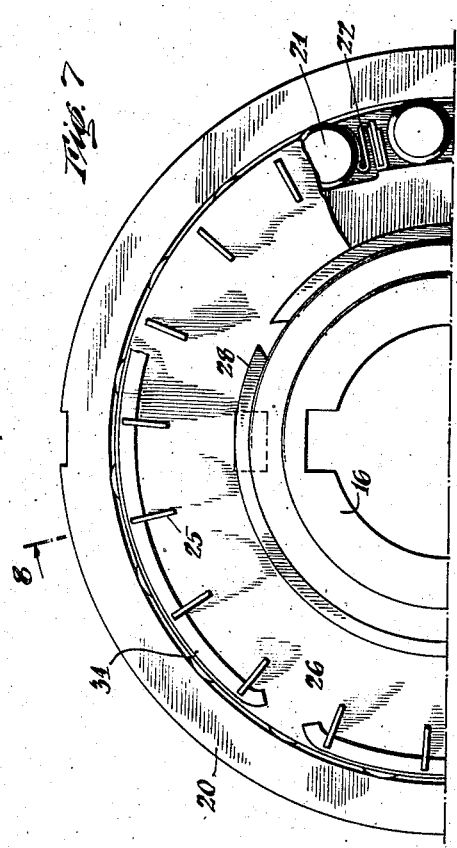
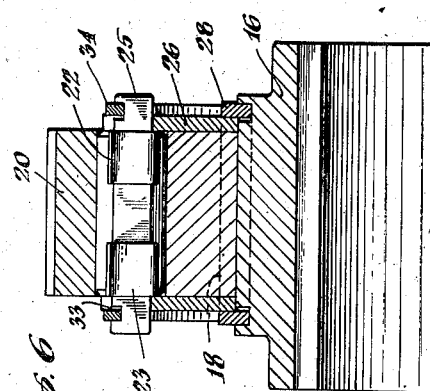
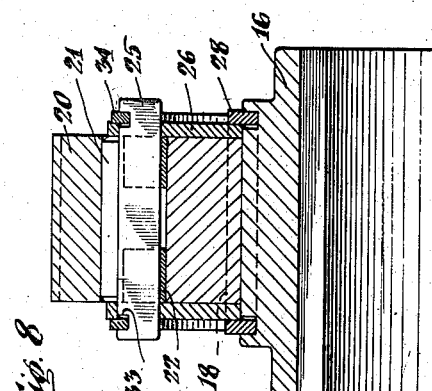
INVENTOR.
John M. Schuckers
BY
ATTORNEYS

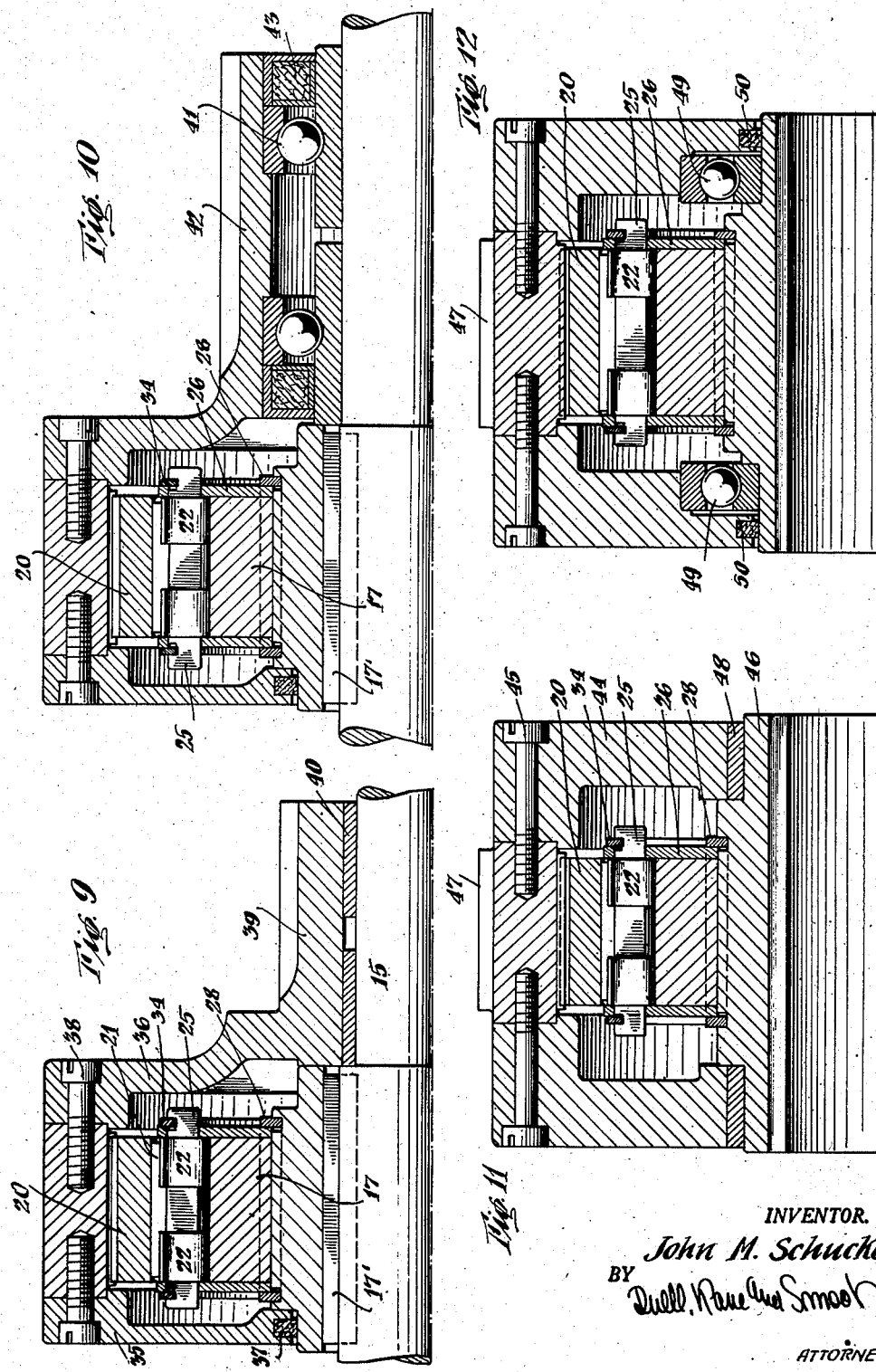

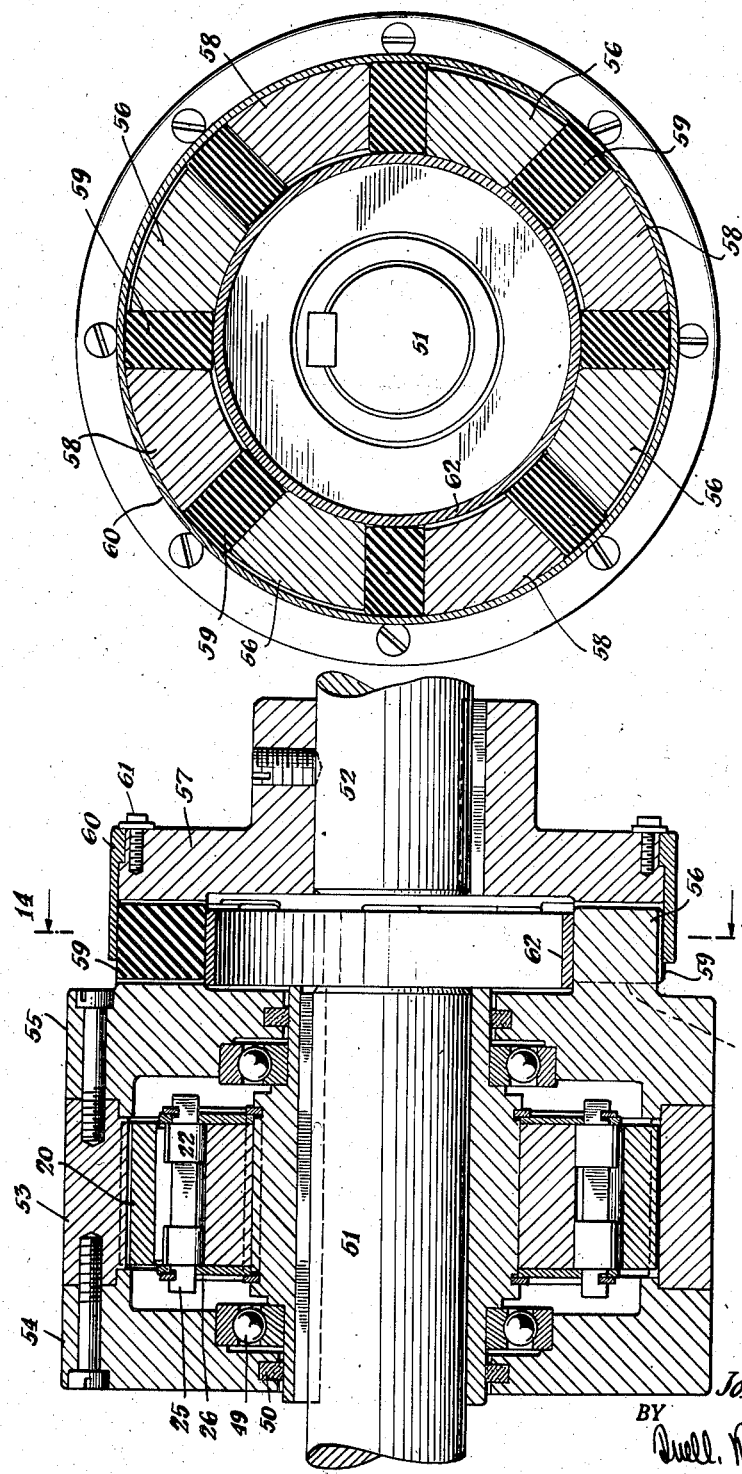

Patented Mar. 20, 1945

2,371,653

UNITED STATES PATENT OFFICE 2,371,653

CLUTCH

John M. Schuckers, Elmira, N. Y., assignor to The Hilliard Corporation, Elmira, N. Y., a corporation of New York Application August 6, 1943, Serial No. 497,567

12 Claims. (Cl. 192—45)

This invention relates to a structurally and functionally improved clutch and in its more specific aspects aims to provide a unit of the specific type known as an "overrunning" clutch.

It is a primary object of the invention to furnish a device of this character and which will be extremely light in weight and compact in construction.

A further object is that of providing a clutch which will embody maximum capacity in proportion to its size.

A still further object of the invention is that of designing a unit of this type which may include relatively few parts, each individually simple and rugged in construction; these parts being designed in a manner such that they may be manufactured with maximum economy and when once assembled may be disconnected and reassembled with minimum effort and without requiring any special tools.

With these and other objects in mind, reference is had to the attached sheets of drawings illustrating practical embodiments of the invention, and in which:

Fig. 1 is a side elevation of a unit with certain of the parts broken away to disclose underlying constructions;

Fig. 2 is a transverse sectional view taken along the lines 2—2 and in the direction of the arrows as indicated in Fig. 1;

Fig. 3 is a fragmentary view similar to Fig. 1 but showing a slightly different form of construction;

Fig. 4 is a sectional view taken along the lines 4—4 in the direction of the arrows as indicated in Fig. 3;

Fig. 5 is a view again similar to Fig. 1 but showing only half of an alternative assembly;

Fig. 6 is a transverse sectional view along the lines 6—6 in the direction of the arrows in Fig. 5;

Fig. 7 corresponds to Fig. 6 but shows a still further form of construction;

Fig. 8 is a transverse sectional view taken along the lines 8—8 in the direction of the arrows in Fig. 7;

Fig. 9 is a somewhat enlarged transverse sectional view showing a still further form of construction;

Figs. 10, 11, and 12 are views corresponding to Fig. 9 but showing alternative constructions;

Fig. 13 is a view similar to Figs. 2 and 12 but showing an alternative construction; and Fig. 14 is a transverse sectional view taken along the lines 14—14 and in the direction of the arrows as indicated in Fig. 13.

Various alternative forms of mechanism constructed in accordance with the teachings of the present invention might be illustrated. It is believed, however, that this is unnecessary in that the obvious modification and rearrangements of the parts will be apparent to anyone skilled in the art; the scope of the invention being also apparent from a review of the appended claims.

Thus, referring primarily to Figs. 1 and 2, the reference numeral 15 indicates a shaft upon which a hub 16 is mounted. Relative rotation between these parts may be prevented in any desired manner as, for example, by employing a key 17'. Concentrically disposed upon the hub 16 is a cam member 17. This cam may have a pressed fit on the hub and may additionally be secured against movement with respect to the same by a key portion 18; it being noted that the length of the latter is preferably in excess of the width of the cam.

The periphery of the cam as especially shown in Fig. 1 provides any desired number of cam portions of roller mounting surfaces 19. Preferably as shown, these surfaces are relatively flat. In any event, it is intended that they be disposed in the form of an annular series with one immediately adjacent the other. Encircling the cam and spaced therefrom is a race member 20. The width of the latter is preferably equal to that of the cam 17. Rollers 21 are interposed between the surfaces 19 and the inner face of the race 20.

With a view to normally maintaining each of these rollers in constant engagement with the opposed surfaces thus presented are springs 22. These springs are manufactured of conveniently flat stock with their bodies generally disposed in the form of the letter W. That arm 23 of the same which is to lie adjacent and in contact with the roller 21 is preferably shaped to provide an exterior contour substantially conforming to that of the roller. The opposite arm 24 of the spring may extend in a direction substantially parallel to the adjacent central portion of the spring and in order—in cooperation with such central portion—to provide what is in effect a clip element.

These springs are preferably disposed one adjacent each of the leading edges of these surfaces. At such points they cooperate with the roller of the next succeeding surface. To maintain the springs in this position, retaining plates 25 are employed. The opposite faces of the arms 24 and adjacent central portion of the spring grip the opposite faces of the plate. Thus the spring is maintained in position.

In order in turn to mount the spring-retaining plates 25 it will be observed that cage plates 26 are utilized and these plates are formed with a series of radially extending slits at points short of their outer edges and through which slits the ends of the spring-retaining plates project. As will also be observed, the cage plates are formed in their inner edges with interrupted portions such that the keys 18 may be accommodated. Accordingly, the plates 26 are prevented from rotating with respect to the hub or cam. The inner edges of the plates 25 are formed with notches at points adjacent their ends and these notches receive lock rings 27. Accordingly, the plates 25 may not shift with respect to the cage plate 26. Sidewise shifting of the latter is, in turn, prevented by snap rings 28 which bear against their outer faces at points adjacent the side edges of the hub. To this end, the latter is formed with grooves 29 which may receive these rings and so that the latter are maintained against movement. Additionally, the snap rings 28 may, if desired, be prevented from circumferential movement incident to the fact that their end portions may conveniently abut the key 18.

In operation, it will be appreciated that with the race member moving relative to the hub and cam in a counterclockwise direction as viewed in Fig. 1 the rollers 21 will bear against these springs, thus compressing the latter and permitting a free overrunning of the parts. While one roller has been shown interposed between each of the surfaces 19 and the adjacent inner face of the race member, it is obvious that, if the clutch is to have less than its maximum capacity potentialities, certain of these rollers may be dispensed with. However, when it is desired to transmit a maximum amount of power by means of a unit having the smallest practical size and lightest weight, all of the roller elements should be employed. Also, as illustrated, these roller elements should be spaced a minimum distance apart; this being permitted incident to the general design of the unit herein illustrated and the springs which cooperate with the rollers.

When the race member as viewed in Fig. 1 moves relative to the shaft in a counter-clockwise direction (either due to movement of the shaft, the race member or both), the rollers will immediately travel along the surfaces 19 and thus wedge between the latter and the inner face of the race. This action will, of course, be assisted by the springs 23 which tend to shift the rollers to such position. With such movements, it is apparent that the cam and race will be locked with respect to each other and will, accordingly, move as a unit. However, the parts may immediately again free themselves in the event that relative movement of these members in a direction opposite to that specified is attempted.

If, for any reason, it becomes necessary to disassemble the unit, it will be obvious that this may readily be done by simply employing a screw driver or similar implement and without its being necessary to have available special tools. Such disassembly may be achieved by simply removing the lock ring 27 and snap ring 28. Thereupon, one or both of the cage plates may be removed. The spring retainer plates will now be readily accessible as will also be true of the rollers and the springs. Renewal of any of the latter may be achieved by simply withdrawing the proper spring and retainer plate assembly and detaching these elements. Thereafter, a new spring may be clipped into position and the retainer plate with the spring mounted thereon may be returned to the proper point in the assembly.

Thereupon, the ends of the retainer plates 25 may be inserted through the corresponding slots in the cage plates and as the latter are brought to proper position adjacent the side faces of the clutch unit. Now by simply applying the lock and snap ring the entire unit is again ready for operation. As will also be appreciated, the higher the speed of rotation and the greater the centrifugal force, the greater will be the tendency of the lock ring 27 to seat in the notches of the retainer plates. It will also be observed that with this form of unit the springs, under all operating conditions, are restrained from moving out of position.

Under certain conditions, it might be desired to provide a construction which will serve to at least generally maintain the rollers when the central portion of the assembly is withdrawn from the race member; it being obvious, as in Figs. 1 and 2, that when this occurs the rollers are not supported except as a consequence of their engagement with the spring, the race member and cam. A construction which will serve to generally maintain the rollers has been illustrated in Figs. 3 and 4 in which reference numerals as heretofore identified are employed to indicate the corresponding parts. It will be noted that the cage plates are formed with openings 31 and the rollers 21, instead of terminating at points adjacent the inner faces of the cage plates, are continued in the form of trunnions 30. The latter extend through the openings 31.

Under all normal conditions of operation, the mechanism, as shown in Figs. 3 and 4, will function substantially identically in the manner heretofore described in connection with Figs. 1 and 2. Also, the assembly and disassembly of the same may follow the same procedure. However, it will be appreciated that the trunnions of the rollers will serve to maintain them in supported position with reference to the cage plates. Accordingly, when the cam is withdrawn from the race, the rollers will be supported.

Again as shown in Figs. 5 and 6, the same reference numerals are employed to identify parts as heretofore described. In this form of apparatus, however, it will be noted that the cage plates are formed with slits 32 extending through to their peripheral edges. The retainer plates 25 may be formed with notches 33 in their outer edge portions to receive snap rings 34. The mass of the latter need not be of the same value as that of the rings 28. Accordingly, the factor of centrifugal force will not have to be considered to the same extent as would have been necessary if these rings were formed of relatively heavy material.

In the event it is desired to have the lock ring supported in the manner shown in Figs. 5 and 6 but to have the cage plates supporting the spring-retainer plates against radial displacement, the desired result may readily be achieved by, for example, the construction shown in Figs. 7 and 8. As will be noted in these figures, the slits which accommodate the ends of the retainer plates do not extend to the periphery of the cage plates. The lock rings, however, do engage notches in the upper edge of the spring-retainer plates to prevent their displacement.

In common with the previously described forms of construction, it will be observed that, as in Figs. 7 and 8, the springs are preferably shorter than the length of the rollers. Also, conveniently they do not project through the cage plates. The key 18 is of sufficient length so that it engages the cage plates and maintains them in a fixed position so that they cannot rotate with respect to the cam and hub. As will be obvious, the key or abutment 18 may be integral with one of the parts and key into the other of the same or else this unit may be in the form of a separate element.

It is considered unnecessary to further illustrate and describe the manifold detailed modifications and rearrangements of the parts which might be resorted to and which might be desirable under certain conditions of operation or installation. The foregoing are illustrative and the clutch parts may, of course, be connected in any desired manner to impart driving force from a driving to a driven member.

One of the more desirable forms of construction utilizable in the latter connection is shown in Fig. 9, in which the parts as generally illustrated in Figs. 7 and 8 have again been shown. As will be observed in Fig. 9, a shaft 15 extends through the entire assembly. The hub, as afore described, is secured to this shaft as, for example, by a key 17'. Side pieces 35 and 36 may be disposed adjacent and form a part of the clutch assembly and bridge the same by a connecting element. A packing 37 may be interposed between the side piece 35 and the hub. These side elements or cover members are secured to the race 20, and the member 36 is extended as at 39 to provide a sleeve for mounting a gear, sprocket, pulley, etc. (not shown). Through this element force may be transmitted by the clutch, or driving force may be transmitted through it to the clutch assembly and in turn to the shaft 15. In view of the fact that the extended portion or sleeve 39 rotates with respect to the shaft 15, a suitable bearing material 40 may be interposed between these parts.

In Fig. 10 a construction generally similar to that shown in Fig. 9 has been illustrated except that in this latter view anti-friction bearings 41 of suitable type may be interposed between the sleeve portion 42 and the shaft 15. While ball bearings have been illustrated, it is apparent that any substitute and desirable type of anti-friction bearing might be employed. Likewise, it is preferred, in this form of construction, to utilize suitable seal or packing elements 43 so that the necessary lubricant may be retained.

In the event it was not desired to employ an extended portion or sleeve 39 or 42, the construction shown in Fig. 11 might be utilized. As will be apparent in this form of unit, side members or pieces 44 may be disposed to each side of the assembly proper and secured to one another and the bridging piece by bolts 45. This bridging piece may provide one or more keys or teeth 47. The hub is, preferably extended as indicated at 46 and layers of bearing material 48 may be interposed at these points. Accordingly, the race is adequately supported by the extensions of the hub of the inner member. Any part of the outer assembly might, under these circumstances, provide a convenient mounting or support for a pulley, gear, sprocket, etc.

As in Fig. 12, the construction illustrated in Fig. 11 might be modified to substitute for the bearings 48 anti-friction bearings 49. Seals 50 might also be provided in order to prevent an escape of lubricant or the entrance of foreign material.

Again with a view to avoiding unnecessary and redundant illustration, further applications of the clutch per se have not been illustrated. In any event, it will be appreciated that an extremely compact form of mechanism is provided and which may be built into any desired assembly, especially where space is an important factor. Additionally, a maximum amount of power may be transmitted by the unit so that, taking into consideration the weight and size factors an assembly of unusual capacity is presented. As afore brought out, it will be a very simple matter to assemble or disassemble the parts of the clutch, and due to the fact that bolts and screws do not have to be employed to maintain the several parts in assembled relation it is unnecessary to tap and drill these parts at the time of their manufacture. Accordingly, it is feasible to reduce expense in this connection.

Again, in Figs. 13 and 14, a clutch has been illustrated of the general type shown in Fig. 12. To this end, identical reference numerals have been employed. However, in this form of construction, shafts 51 and 52 are to be coupled. To this end the bridging piece 53 does not carry or present a gear. Rather, it is directly supported against movement with respect to the side pieces 54 and 55 and is provided with a series of extensions 56.

The part 57 is furnished with a similar annular series of projections 58 which extend into the spaces intervening the extensions 56. Blocks 59 of yielding material—such as rubber—may be interposed between adjacent extensions. A retainer ring or shroud 60 may be secured by bolts 61 against movement with respect to member 57. This ring overlies the blocks or elements 59. A retaining ring 62 may be employed to maintain these blocks or load cushions in place.

Thus there is provided a desirable form of flexible coupling which is incorporated in the clutch. This coupling transmits power from one to another shaft while permitting of some misalignment. Obviously, alternative forms of coupling might be employed and clutch assemblies similar to those illustrated in Figs. 1 to 11 might be incorporated therein.

Thus it will be appreciated that among others the several objects of the invention as specifically afore noted are achieved. Obviously, numerous changes in construction and rearrangements of the parts might be resorted to without departing from the spirit of the invention as defined by the claims.

I claim:

1. A clutch including in combination a pair of members, one encircling and spaced from the other, at least one of said members presenting an annular series of cam surfaces, wedging elements bearing against said surfaces and extending between said members, springs interposed between said elements, one of each of said springs having one of its ends acting against an adjacent element, retaining means for each of said springs and secured to the other end of the latter, cage plates disposed adjacent one of said members, and means for securing said retaining means against movement with respect to said cage plates.

2. A clutch including in combination a pair of members, one encircling and spaced from the other, at least one of said members presenting an annular series of cam surfaces, wedging elements bearing against said surfaces and extending between said members, springs interposed between said elements, one of each of said springs having one of its ends acting against an adjacent element, retaining means for each of said springs and secured to the other end of the latter, cage plates disposed adjacent one of said members, and said plates being formed with slits; the ends of said retaining means extending through said slits.

3. A clutch including in combination a pair of members, one encircling and spaced from the other, at least one of said members presenting an annular series of cam surfaces, wedging elements bearing against said surfaces and extending between said members, springs interposed between said elements, one of each of said springs having one of its ends acting against an adjacent element, retaining means for each of said springs and secured to the other end of the latter, cage plates disposed adjacent one of said members, and said plates being formed with slits; the ends of said retaining means extending through said slits and being formed with notches and a securing ring extending into said notches to prevent displacement of said retaining means with respect to said cage plates.

4. A clutch including in combination a pair of members, one encircling and spaced from the other, at least one of said members presenting an annular series of cam surfaces, wedging elements bearing against said surfaces and extending between said members, springs interposed between said elements, one of each of said springs having one of its ends acting against an adjacent element, retaining means for each of said springs and secured to the other end of the latter, cage plates disposed adjacent one of said members, and said plates being formed with slits; the ends of said retaining means extending through said slits and being formed with notches and a securing ring encircling all of said retaining means and extending into the notches of the same to prevent displacement thereof with respect to said cage plates.

5. A clutch including in combination a pair of members, one encircling and spaced from the other, at least one of said members presenting an annular series of cam surfaces, wedging elements bearing against said surfaces and extending between said members, springs interposed between said elements, one of each of said springs having one of its ends acting against an adjacent element, retaining means for each of said springs and secured to the other end of the latter, cage plates disposed adjacent one of said members, and said plates being formed with slits; the ends of said retaining means extending through said slits and being formed with notches and a securing ring bearing against the inner edges of said retaining means and into the notches of the same to prevent displacement thereof with respect to said cage plates.

6. A clutch including in combination a pair of members, one encircling and spaced from the other, at least one of said members presenting an annular series of cam surfaces, wedging elements bearing against said surfaces and extending between said members, springs interposed between said elements, one of each of said springs having one of its ends acting against an adjacent element, retaining means for each of said springs and secured to the other end of the latter, cage plates disposed adjacent one of said members, and said plates being formed with slits and the ends of said retaining means extending through said slits; and said slits extending through to the periphery of said cage plates.

7. A clutch including in combination a pair of members, one encircling and spaced from the other, at least one of said members presenting an annular series of cam surfaces, wedging elements bearing against said surfaces and extending between said members, springs interposed between said elements, one of each of said springs having one of its ends acting against an adjacent element, retaining means for each of said springs and secured to the other end of the latter, cage plates disposed adjacent one of said members and securing said retaining means against movement with respect thereto, and an abutment forming a part of said member and engaged by said plates to prevent rotation of the latter with respect to said member.

8. A clutch including in combination a pair of members, one encircling and spaced from the other, at least one of said members presenting an annular series of cam surfaces, wedging elements bearing against said surfaces and extending between said members, springs interposed between said elements, one of each of said springs having one of its ends acting against an adjacent element, retaining means for each of said springs and secured to the other end of the latter, cage plates disposed adjacent one of said members and securing said retaining means against movement with respect thereto, an abutment forming a part of said member and engaged by said plates to prevent rotation of the latter with respect to said member, said member being formed with a groove, a ring disposed within said groove and bearing against an adjacent cage plate to prevent sidewise displacement of the latter.

9. A clutch including in combination a pair of members, one encircling and spaced from the other, at least one of said members presenting an annular series of cam surfaces, wedging elements bearing against said surfaces and extending between said members, springs interposed between said elements, one of each of said springs having one of its ends acting against an adjacent element, retaining means for each of said springs and secured to the other end of the latter, cage plates disposed adjacent one of said members and securing said retaining means against movement with respect thereto, an abutment forming a part of said member and engaged by said plates to prevent rotation of the latter with respect to said member, said member being formed with a groove, a ring disposed within said groove and bearing against an adjacent cage plate to prevent sidewise displacement of the latter; said ring being split and the end of said ring bearing against said abutment.

10. A clutch including in combination a pair of members, one encircling and spaced from the other, at least one of said members presenting an annular series of cam surfaces, wedging elements bearing against said surfaces and extending between said members, springs interposed between said elements and each including a convolute body and a clip-shaped end portion, the opposite ends of said springs acting against the adjacent elements, retaining means extending between said elements and adapted to have the clip-like end portions of the springs secured thereto, and means for anchoring said retaining means against movements with respect to one of said members.

11. A clutch including in combination a pair of members, one encircling and spaced from the other, at least one of said members presenting an annular series of cam surfaces, roller elements bearing against said surfaces and extending between said members, springs interposed between said elements, one of each of said springs having one of its ends acting against an adjacent element, retaining means for each of said springs and secured to the other end of the latter, cage plates disposed adjacent one of said members and mounting said spring-retaining means, trunnions extending from the ends of said rollers, and said plates being formed with openings of greater area than said trunnions to mount the latter.

12. A clutch including in combination a pair of members, one encircling and spaced from the other, at least one of said members presenting an annular series of cam surfaces, wedging elements mounted upon said surfaces and extending between said members, springs interposed between said elements, one of each of said springs acting against an adjacent element, retaining means for each of said springs and secured to the other end of the latter, means for anchoring said retaining means against movements with respect to one of said members, a side piece connected to the outermost of said members, the innermost member being adapted to be connected to a shaft, a further member to be connected to a second shaft and to lie adjacent said side member, extensions forming parts of the latter and said further member and adapted to be disposed in substantially the same transverse plane, and load cushions interposed between adjacent extensions to provide a flexible coupling between said first named pair of members and said further member.

JOHN M. SCHUCKERS.